US009219366B2

(12) United States Patent
Kim

(10) Patent No.: US 9,219,366 B2
(45) Date of Patent: Dec. 22, 2015

(54) ENERGY STORAGE DEVICE AND METHOD FOR DECREASING RUSH CURRENT

(71) Applicant: SAMSUNG SDI CO., LTD., Yongin-si, Gyeonggi-do (KR)

(72) Inventor: Woocheol Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 445 days.

(21) Appl. No.: 13/661,031

(22) Filed: Oct. 25, 2012

(65) Prior Publication Data

US 2014/0002003 A1   Jan. 2, 2014

(30) Foreign Application Priority Data

Jun. 29, 2012   (KR) .................. 10-2012-0071150

(51) Int. Cl.
| | |
|---|---|
| *H02J 7/00* | (2006.01) |
| *H01M 2/20* | (2006.01) |
| *H02J 3/32* | (2006.01) |
| *H01M 10/44* | (2006.01) |
| *H02J 3/38* | (2006.01) |
| *H02J 7/35* | (2006.01) |
| *H01M 2/10* | (2006.01) |
| *H01M 10/42* | (2006.01) |

(52) U.S. Cl.
CPC .............. *H02J 7/00* (2013.01); *H01M 2/202* (2013.01); *H01M 10/441* (2013.01); *H02J 3/32* (2013.01); *H02J 7/0026* (2013.01); *H01M 2/10* (2013.01); *H01M 2010/4271* (2013.01); *H02J 3/382* (2013.01); *H02J 3/385* (2013.01); *H02J 7/35* (2013.01); *Y02E 10/58* (2013.01); *Y02E 70/30* (2013.01)

(58) Field of Classification Search
CPC .......... H02J 7/00; H02J 7/0024; H01M 2/202
USPC ................................. 320/124, 117
See application file for complete search history.

(56) References Cited

U.S. PATENT DOCUMENTS

| | | | | |
|---|---|---|---|---|
| 5,780,991 | A * | 7/1998 | Brake et al. ................... | 320/112 |
| 6,160,377 | A * | 12/2000 | Fujii .............................. | 320/117 |
| 7,701,087 | B2 * | 4/2010 | Eckroad et al. ................ | 307/46 |
| 8,248,031 | B2 * | 8/2012 | Yamasaki et al. ............. | 320/124 |
| 8,917,060 | B2 * | 12/2014 | Shigemizu et al. ........... | 320/118 |
| 8,933,667 | B2 * | 1/2015 | Park et al. ..................... | 320/126 |
| 2002/0171397 | A1 * | 11/2002 | Adrian et al. ................. | 320/119 |
| 2008/0315826 | A1 * | 12/2008 | Alberth et al. ................ | 320/101 |
| 2009/0121687 | A1 * | 5/2009 | Kobayashi et al. ........... | 320/162 |
| 2011/0127964 | A1 | 6/2011 | Nishida et al. | |
| 2011/0260539 | A1 * | 10/2011 | Wai et al. ...................... | 307/66 |
| 2012/0074901 | A1 * | 3/2012 | Mohammed ................... | 320/109 |

(Continued)

FOREIGN PATENT DOCUMENTS

| | | |
|---|---|---|
| JP | 2010-45923 A | 2/2010 |
| KR | 10-2009-0014898 A | 2/2009 |
| KR | 10-2011-0039242 A | 4/2011 |

*Primary Examiner* — M'Baye Diao

(74) *Attorney, Agent, or Firm* — Christie, Parker & Hale, LLP

(57) ABSTRACT

An energy storage device and method for decreasing a rush current to protect battery cells and battery management systems (BMSs) from a rush current by sequentially coupling battery packs to each other in parallel to a grid. To this end, the BMS measures voltages of at least three battery packs and then sequentially in parallel couples battery packs in order from a smallest to a largest voltage to thereby reduce the rush current.

15 Claims, 5 Drawing Sheets

(56) References Cited

U.S. PATENT DOCUMENTS

2012/0119708 A1* 5/2012 Toya .............................. 320/137
2012/0319652 A1* 12/2012 Namou et al. ................ 320/116

* cited by examiner

ENERGY STORAGE DEVICE AND METHOD FOR DECREASING RUSH CURRENT

CROSS-REFERENCE TO RELATED APPLICATION

This application claims priority to and the benefit of Korean Patent Application No. 10-2012-0071150, filed on Jun. 29, 2012, in the Korean Intellectual Property Office, the disclosure of which is incorporated herein in its entirety by reference.

BACKGROUND

1. Field

Embodiments of the present invention relate to an energy storage device and a method for decreasing a rush current.

2. Description of the Related Art

In a high-capacity energy storage device, such as an energy storage system (ESS), a plurality of battery packs may be configured by coupling battery cells (e.g., scores or several hundreds of battery cells) to each other in series and/or in parallel, and the battery packs may be coupled to each other in parallel to thereby maintain driving voltage and efficiently output energy.

Herein, when one battery pack is removed from the energy storage system and is then reconnected thereto, if there is a potential difference between an already coupled battery pack and the battery pack to be reconnected, a rush current is generated, which reduces the potential difference.

Battery management systems (BMSs) or battery cells may be damaged by the rush current. Therefore, reducing or minimizing the rush current is a way to improve stability of battery packs and to increase lifetimes thereof.

SUMMARY

An aspect of the present invention provides an energy storage device and method for decreasing a rush current to protect battery cells and battery management systems (BMSs) from the rush current by sequentially coupling battery packs to each other in parallel.

According to embodiments of the present invention, an energy storage device is provided for reducing a rush current, the device including: at least three battery packs configured to be coupled to a grid in parallel with each other; switches configured to electrically couple or block the at least three battery packs to or from the grid; and a battery management system (BMS) configured to control the at least three battery packs and the switches. Here, the BMS is configured to control the switches to sequentially couple the at least three battery packs to the grid in a lowest to highest order according to a voltage of each of the battery packs.

Each of the at least three battery packs may include a plurality of battery cells coupled to each other in series, a voltage sensor, and a current sensor.

The BMS may include at least three pack BMSs corresponding to the at least three battery packs, and a system BMS.

Each of the at least three pack BMSs may be configured to receive a voltage measurement and a current measurement of a respective one of the at least three battery packs, may be configured to transfer the received voltage measurement and current measurement to the system BMS, may be configured to receive a control signal from the system BMS for turning on or off a corresponding one of the switches, and may be configured to turn on or off the corresponding one of the switches according to the control signal.

The system BMS may be configured to receive voltages and currents of the at least three battery packs from the at least three pack BMSs to control turning on or off of the switches.

In an embodiment of the present invention, the BMS controls the switches to couple an arbitrary one of the at least three battery packs to be a first battery pack coupled to the grid in a coupling sequence.

The BMS may control the switches to sequentially couple to the grid remaining ones of the at least three battery packs that are blocked from the grid according to a respective voltage difference between a currently coupled battery pack and the remaining ones of the at least three battery packs that are blocked from the grid.

The BMS may control the switches to sequentially couple to the grid the at least three battery packs in an order of a lowest to highest voltage as between remaining ones of the at least three battery packs that are blocked from the grid.

According to another embodiment of the present invention, a method is provided for reducing a rush current when coupling at least three battery packs in parallel to a grid, the method including: blocking all connections of the at least three battery packs to the grid; holding for a first time to stabilize respective voltages and currents of the blocked at least three battery packs; measuring the respective voltages of the at least three battery packs after holding for the first time; coupling an arbitrary first battery pack from among the at least three battery packs after performing the measuring of the respective voltages of the at least three battery packs; coupling a second battery pack from among remaining ones of the at least three battery packs that are blocked from the grid, the second battery pack having a voltage difference with respect to the first battery pack that is the smallest of respective voltage differences of the remaining ones of the at least three battery packs that are blocked from the grid; holding for a second time, when at least two battery packs are coupled to the grid, to stabilize voltages and currents of the at least two battery packs that are coupled to the grid before additionally coupling a blocked battery pack from among the remaining ones of the at least three battery packs that are blocked from the grid; and coupling a third battery pack from among the remaining ones of the at least three battery packs that are blocked from the grid, which has a voltage difference that is the smallest of the respective voltage differences, with respect to the second battery pack, of the remaining ones of the at least three battery packs that are blocked from the grid after repeating the holding for the second time.

The voltage difference between the second and first battery packs may be evaluated in terms of an absolute value.

The second time may be differently settable according to structures and wiring of the at least three battery packs.

The second time may be a period of time for currents of the coupled at least two battery packs to become smaller than about 10 A.

According to another embodiment of the present invention, a method is provided for reducing a rush current between at least two battery packs when coupling the at least two battery packs to a grid in parallel, the method including: blocking all connections of the at least two battery packs to the grid; holding for a first time to stabilize respective voltages and currents of the blocked at least two battery packs; measuring the respective voltages of the blocked at least two battery packs after performing the holding for the first time; coupling to the grid a battery pack having the lowest voltage from among the blocked at least two battery packs after performing the measuring of the respective voltages of the at least two battery packs; and determining whether or not all of the at least two battery packs are coupled to the grid.

The method may further include, where the number of the at least two battery packs is three or more, holding for a second time, when it is determined that all of the at least two battery packs are not coupled to the grid, to stabilize voltages and currents of already coupled battery packs before additionally coupling blocked battery packs.

The second time may be differently settable according to structures and wiring of the at least two battery packs.

The second time may be a period of time taken for currents of the already coupled battery packs to become smaller than about 10 A.

BRIEF DESCRIPTION OF THE DRAWINGS

The accompanying drawings are included to provide a further understanding of the present invention, and correspond to this specification. The drawings illustrate exemplary embodiments of the present invention and, together with the description, serve to explain aspects of the present invention. In the drawings.

DETAILED DESCRIPTION

Figure 1:
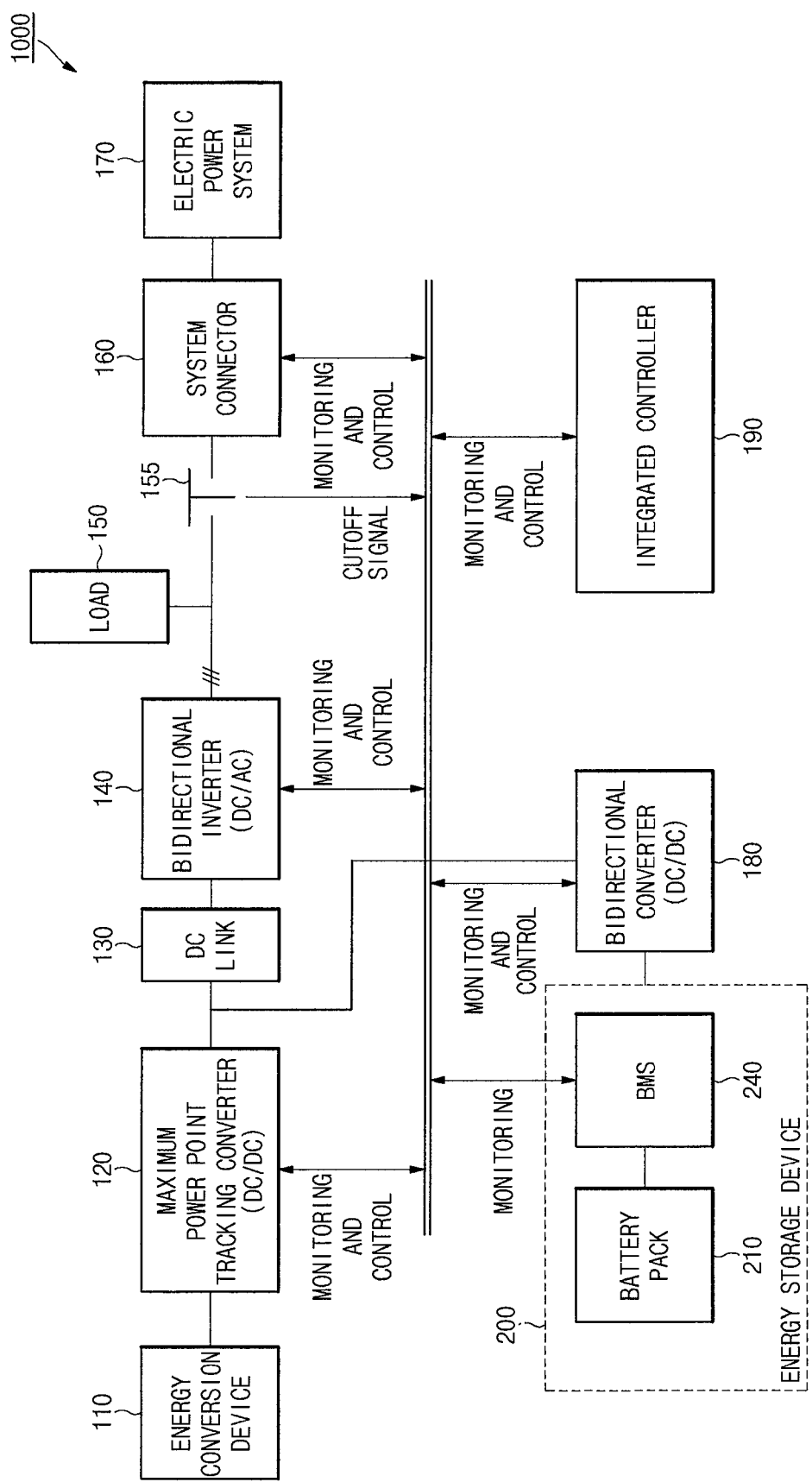
FIG. 1 is a schematic block diagram illustrating an example energy storage system (ESS)

Example embodiments of the present invention will now be described more fully hereinafter with reference to the accompanying drawings; however, the present invention may be embodied in different forms and should not be construed as limited to the embodiments set forth herein. Rather, these embodiments are provided so that this disclosure will be thorough and complete, and will fully convey the scope of the disclosure to those skilled in the art.

Throughout the specification, like reference numerals denote like elements. When one element is referred to as being coupled (e.g., electrically coupled or connected) to another element, the one element may be directly coupled to the another element or indirectly coupled to the another element via one or more intervening elements.

FIG. 1 is a schematic block diagram illustrating an example energy storage system (ESS).

As illustrated in FIG. 1, an energy storage system (ESS) 1000 includes an energy conversion device 110, a maximum power point tracking converter 120, a direct current (DC) link 130, a bidirectional inverter 140, a load 150, a system connector 160, an electric power system 170, a bidirectional converter 180, an integrated controller 190, a battery pack 210, and a battery management system (BMS) 240.

The energy conversion device 110 includes devices for converting renewable energy from sunlight, wind, water, geothermal heat, and the like into electric energy. More specifically, the energy conversion device 110 may include a solar cell, a wind-driven generator, and the like to convert renewable energy into electric energy. Hereinafter, and for the sake of convenience, embodiments of the present invention will describe the energy conversion device 110 as including a solar cell.

The maximum power point tracking converter 120 extracts maximum power from the energy conversion device 110, converts the maximum power to DC power with a different level (e.g., to a suitable voltage level), and outputs the DC power. For example, an output of a solar cell changes nonlinearly according to an amount of solar radiation and a surface temperature. This phenomenon is a cause of degradation of generating efficiency of the solar cell. The maximum power point tracking converter 120 allows an operating point of the solar cell, which is nonlinearly changed according to the amount of solar radiation and the surface temperature of the solar cell, to always be a maximum power point. Further, DC power extracted at the maximum power point is converted into DC power with a different level (e.g., voltage level), and is then provided to the DC link 130.

The DC link 130 temporarily stores the DC power provided by the maximum power point tracking converter 120. The DC link 130 may be substantially a high-capacity capacitor (or a plurality of capacitors). Accordingly, the DC link 130 may remove an alternating current (AC) component from the DC power outputted from the maximum power point tracking converter 120 to store a stable DC power. Further, the DC link 130 stabilizes and temporarily stores DC power provided from the bidirectional inverter 140 or the bidirectional converter 180.

The bidirectional inverter 140 coverts the DC power provided from the DC link 130 to a commercial AC power (e.g., 120 Vat 60 Hz) to output the commercial AC power. Substantially, the bidirectional inverter 140 converts DC voltage from the energy conversion device 110 or the battery pack 210 to the commercial AC power, which may be used in home, and outputs the commercial AC power. Further, the bidirectional inverter 140 converts commercial AC power provided from the electric power system 170 to DC power to provide the DC power to the DC link 130. That is, the power stored in the DC link 130 may be provided to the battery pack 210 via the bidirectional converter 180.

The load 150 may be, for example, a home or an industrial facility using commercial AC power. The load 150 may be provided with the commercial AC power from the energy conversion device 110, the battery pack 210, or the electric power system 170.

The system connector 160 may couple the bidirectional inverter 140 to the electric power system 170. Additionally, the system connector 160 may adjust a voltage variation range, suppress a high frequency, and remove a DC component to provide the AC power of the bidirectional inverter 140 to the electric power system 170, or may provide the AC power of the electric power system 170 to the bidirectional inverter 140.

The electric power system 170 is an AC power system provided, for example, by an electric power company or electricity generating company. For example, the electric power system 170 may be a wide-area electric linkage including a power plant, a substation, and a power line.

The bidirectional converter 180 converts DC power from the DC link 130 to DC power with a different level (e.g., voltage level), which is suitable for the battery pack 210. Likewise, the bidirectional converter 180 converts DC power of the battery pack 210 to DC power with a different level (e.g., voltage level), which is suitable for the DC link 130. The bidirectional converter 180 may be formed as a single structure, and may be insulative or non-insulative.

The integrated controller 190 may monitor and control the maximum power point tracking converter 120, the bidirectional inverter 140, the system connector 160, and the bidirectional converter 180. Further, the integrated controller 190 may communicate with the BMS 240 to monitor the BMS 240. Substantially, the integrated controller 190 may sense voltage, current, and temperature of each of the maximum power point tracking converter 120, the bidirectional inverter 140, the system connector 160, and the bidirectional converter 180, and may control each of the maximum power point tracking converter 120, the bidirectional inverter 140, the system connector 160, and the bidirectional converter 180. Further, the integrated controller 190 may cut off a circuit breaker 155 installed between the load 150 and the system connector 160 in an emergency situation.

The battery pack 210 may be a secondary battery which is rechargeable. For example, the battery pack 210 may be a lithium ion battery, lithium polymer battery, or equivalent thereof, but is not limited thereto.

The BMS 240 maintains and manages the battery pack 210. For example, the BMS 240 may monitor voltage, current, and temperature of the battery pack 210, and may warn a user at the time of an abnormal occurrence. Further, the BMS 240 may calculate a state of charge (SOC) and state of health (SOH) of the battery pack 210, perform cell balancing for equalizing voltages or capacities of batteries, and control a cooling fan (not illustrated) to prevent the battery pack 210 from overheating.

Hereinafter, an energy storage device and method for decreasing a rush current according to embodiments of the present invention will be described with reference to FIGS. 2-5.

Figure 2:
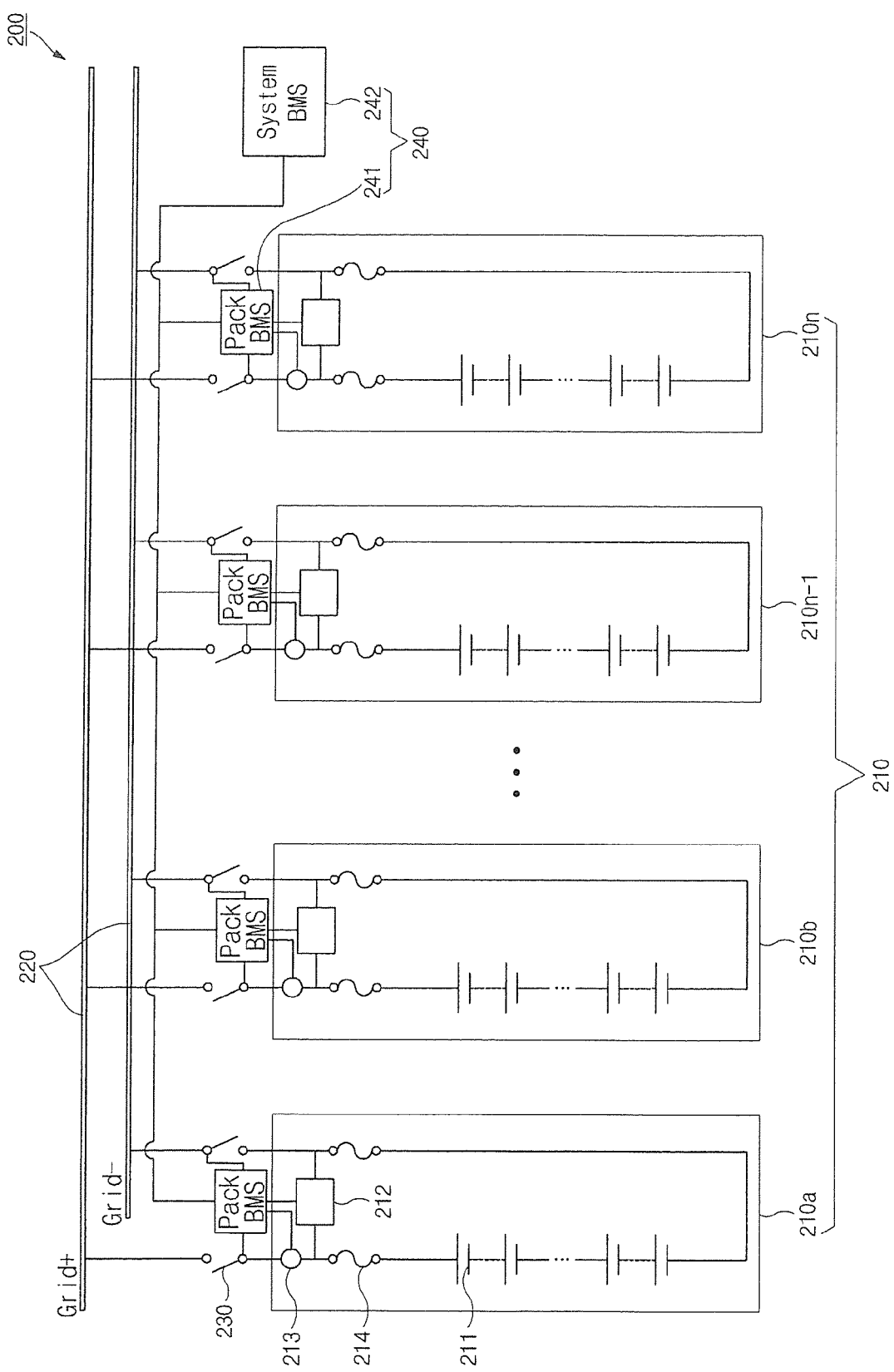
FIG. 2 is a schematic block diagram illustrating an energy storage device for reducing a rush current by controlling turning on/off of a switch by a pack BMS according to an embodiment of the present invention.
Figure 3:
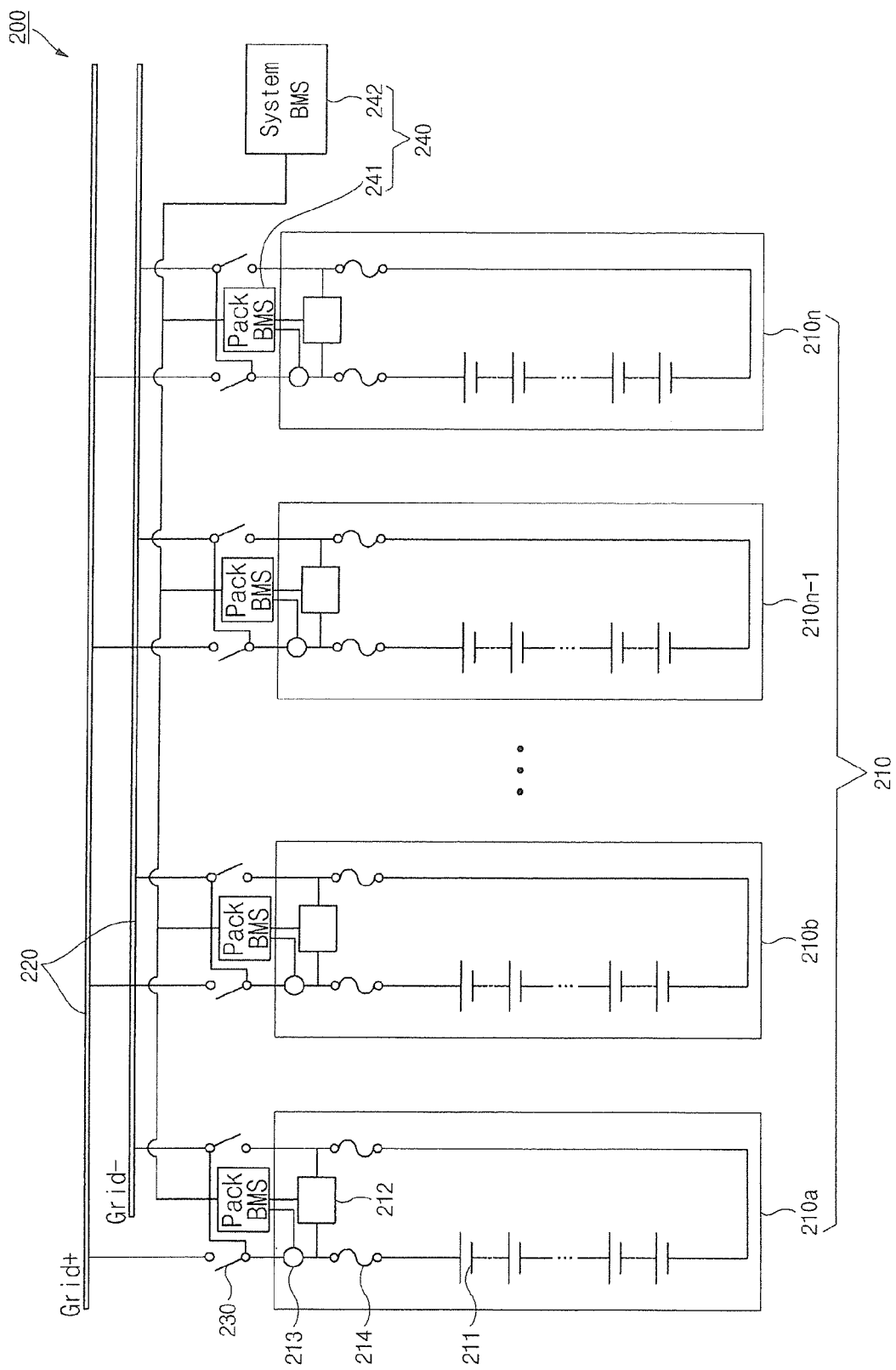
FIG. 3 is a schematic block diagram illustrating an energy storage device for reducing a rush current by controlling turning on/off of a switch by a system BMS according to another embodiment of the present invention.

FIGS. 2 and 3 are schematic block diagrams illustrating an energy storage device for reducing a rush current according to an embodiment of the present invention.

As illustrated in FIG. 2, an energy storage device 200 for reducing or minimizing a rush current according to an embodiment of the present invention may include battery packs (e.g., at least three battery packs 210), a grid 220 to which the at least three battery packs 210 are coupled in parallel, a switch 230 for electrically coupling or blocking the at least three battery packs 210 to or from the grid 220, and a BMS 240 for controlling the at least three battery packs 210 and the switch 230.

In FIG. 2, each of the at least three battery packs 210 includes a plurality of battery cells 211 coupled to each other in series, a voltage sensor 212, a current sensor 213, and a fuse 214.

The battery cells 211 may be arranged in series in each of the at least three battery packs 210, and may include rechargeable secondary batteries.

The voltage sensor 212 may be coupled to a positive electrode and a negative electrode of the battery pack 210 and may measure a voltage of the whole battery pack 210 to transfer the measured voltage value to the BMS 240.

The current sensor 213 may be coupled in series with the positive electrode of the battery packs 210 and may measure a current of the whole battery pack 210 to transfer the measured current value to the BMS 240.

Fuses 214 may be coupled to each of the positive electrode and the negative electrode of the battery pack 210 to protect the battery pack 210 from an overcurrent or an overvoltage.

The at least three battery packs 210 are coupled in parallel to the grid 220. Herein, the grid 220 provides charging and discharging paths to the at least three battery packs 210.

In FIG. 2, for each of the three battery packs 210, a corresponding switch 230 is interposed between the battery pack 210 and the grid to couple or disconnect the battery pack 210 to the grid 220. The switches 230 may be coupled to the BMS 240 to receive a control signal from the BMS 240 to electrically couple or block (e.g., disconnect) the at least three battery packs 210 to or from the grid 220.

The BMS 240 may include at least three pack BMSs 241 and a system BMS 242.

According to an embodiment of the present invention, each of the at least three pack BMSs 241 is respectively coupled to a corresponding one of the at least three battery packs 210 to receive a voltage value and current value respectively from the voltage sensor 212 and current sensor 213 of the corresponding one of the at least three battery packs 210. The received voltage values and current values may be transferred to the system BMS 242 coupled to each of the at least three pack BMSs 241.

Accordingly, the system BMS 242 may receive, from the pack BMSs 241 coupled thereto, the voltage and current values of each of the at least three battery packs 210.

The system BMS 242 may transfer a signal for sequentially controlling turning on and off of the switch 230 to the at least three pack BMSs 241 coupled to the system BMS 242 so that the pack BMS 242 may control turning on and off of the switch 230 coupled thereto.

However, the present invention is not limited there to, and, as illustrated in FIG. 3, the system BMS 242 may be directly coupled to the switch 230 to sequentially control turning on and off of the switch 230.

Hereinafter, a method for reducing or minimizing a rush current, according to an embodiment of the present invention, will be described with reference to FIGS. 4 and 5.

Figure 4:
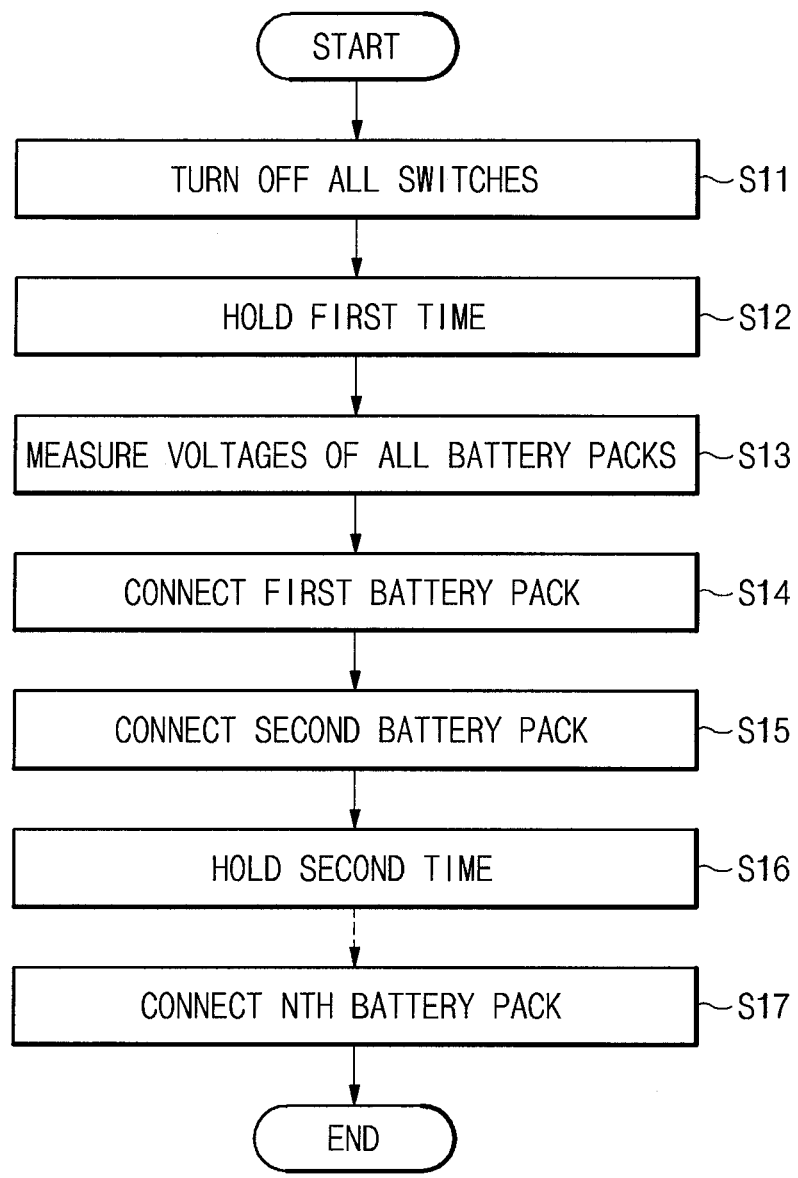
FIG. 4 is a flowchart illustrating a method for reducing a rush current according to an embodiment of the present invention.

FIG. 4 is a flowchart illustrating a method for reducing or minimizing a rush current according to an embodiment of the present invention.

Referring to FIG. 4, the method for reducing or minimizing the rush current includes: a total switch turn-off operation S11, in which all connections to battery packs are blocked; a first time holding operation S12, in which a first time is held (e.g., a delay is introduced) to stabilize respective voltages and currents of the blocked battery packs; a total battery pack voltage measuring operation S13, in which the respective voltages of the battery packs are measured after holding the first time; a first battery pack coupling operation S14, in which an arbitrary first battery pack among the battery packs is coupled to the grid 220 after measuring the total battery pack voltages; a second battery pack coupling operation S15, in which a second battery pack of which a voltage difference with respect to the first battery pack is smallest is coupled to the grid 220; a second time holding operation S16, in which a second time is held, in a state where at least two battery packs are coupled to the grid, to stabilize voltage and current between the at least two battery packs before additionally coupling any of the blocked battery packs; and an nth battery pack (e.g., a third battery pack) coupling operation (S17), in which an nth battery pack (e.g., a third battery pack) is coupled to the grid after holding the second time.

According to an embodiment of the present invention, the total switch turn-off operation S11 may be the case where at least one of the battery packs 210 is removed from the grid 220 for repair or replacement, and is then reconnected to the grid. Here, each of the switches 230 are turned off to block each of the battery packs 210 from the grid 220.

In the first time holding operation S12, a certain period of time is held (e.g., a delay is introduced) to stabilize respective voltages and currents of the battery packs 210 blocked from the grid 220. Herein, the holding time of the first time holding operation S12 may be set according to voltages, currents, structures, and wiring of the battery packs 210.

In the total battery pack voltage measuring operation S13, each of the voltage sensors 212 measures the voltage of a corresponding one of the battery packs 210 that have undergone the first time holding operation S12, and transfers the measured value to the BMS 240.

In the first battery pack coupling operation S14, the BMS 240 selects an arbitrary first battery pack 110*a* from among the battery packs 210 of which voltages have been measured in the total battery pack voltage measuring operation S13, and couples the first battery pack 110*a* to the grid 220.

In the second battery pack coupling operation S15, the BMS 240 selects a second battery pack 110*b* that has a voltage difference with respect to the first battery pack 110*a*, in terms of an absolute value regardless of a positive or negative value, which is smallest from among the blocked battery packs 110, and couples the second battery pack 110*b* to the grid 220 via the switch 230.

In the second time holding operation S16, which includes a state where at least two of the battery packs 210*a*, 210*b*, . . . , 210*n*−1 are coupled, a certain period of time is held (e.g., a delay is introduced) to stabilize voltages and currents between the at least two of the battery packs 210*a*, 210*b*, . . . , 210*n*−1 which are coupled to the grid before the BMS 240 additionally couples another blocked battery pack 210*n*. Herein, the holding time of second time holding operation S16 may be set according to voltages, currents, structures, and wiring of the battery packs 210, and may be about 200 to about 300 msec. However, the holding time of the second time holding operation S16 is not limited thereto.

Further, in the second time holding operation S16, the holding time may be a suitable period of time for a current of the at least two battery packs 210*a*, 210*b*, 210*n*-1 to become smaller than about 10 A.

In the nth battery pack coupling operation S17, the BMS 240 selects an nth battery pack 210*n* that has a voltage difference, in terms of an absolute value regardless of a positive or negative value, as from the stabilized voltage between the at least two battery packs 210*a*, 210*b*, 210*n*−1 already coupled to the grid that is smallest from among the battery packs 210 blocked from the grid, and couples the nth battery pack 210*n* to the grid 220.

In the method for reducing or minimizing the rush current according to an embodiment of the present invention, battery packs are sequentially coupled in order from smallest to largest voltage difference with respect to an arbitrary first battery pack, with a holding time in-between each successive coupling. Therefore, in comparison with use of a special switch and resistor, the rush current may be more stably reduced and the battery pack coupling time may be shortened.

Figure 5:
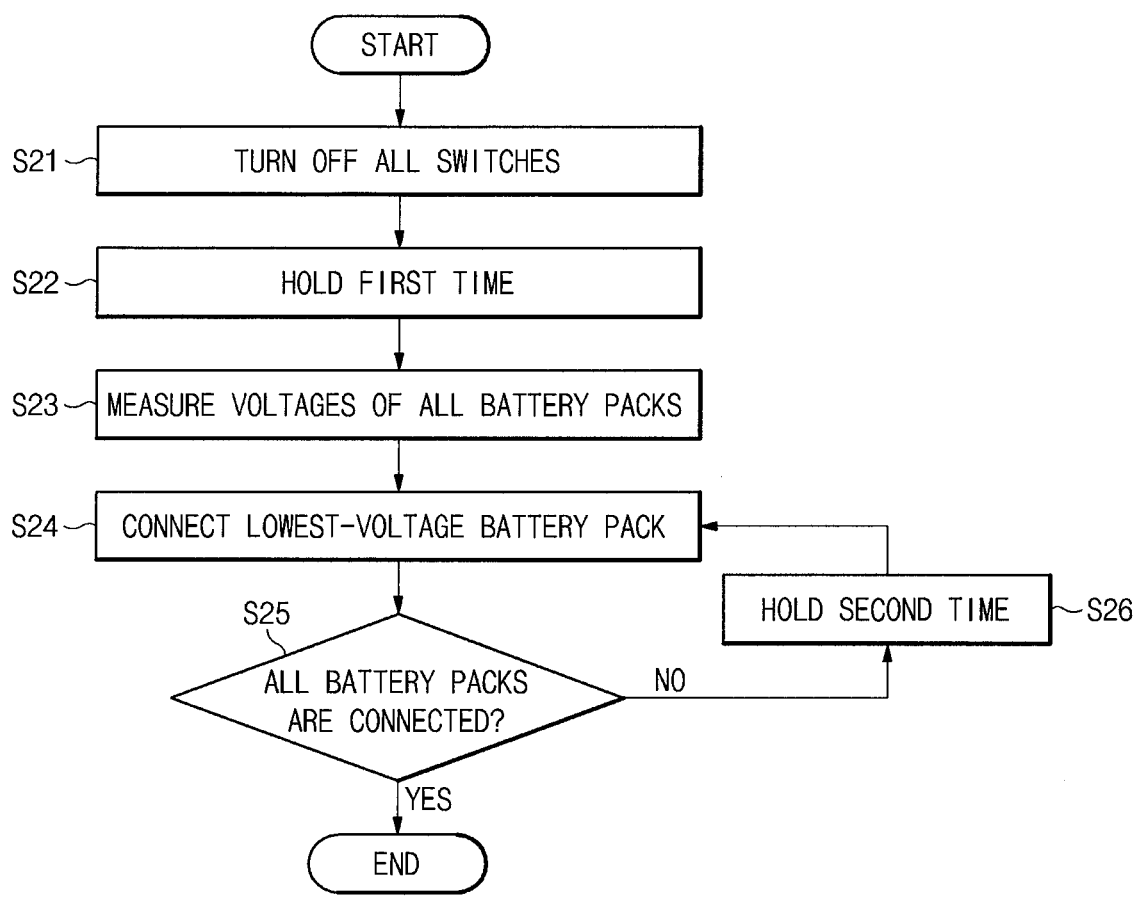
FIG. 5 is a flowchart illustrating a method for reducing a rush current according to another embodiment of the present invention.

FIG. 5 is a flowchart illustrating a method for reducing or minimizing a rush current according to another embodiment of the present invention.

Referring to FIG. 5, the method for reducing or minimizing the rush current includes: a total switch turn-off operation S21, in which all connections to battery packs are blocked; a first time holding operation S22, in which a first time is held (e.g., a delay is introduced) to stabilize respective voltages and currents of the blocked battery packs; a total battery pack voltage measuring operation S23, in which the voltage of each of the battery packs is measured after holding the first time; a lowest-voltage battery pack coupling operation S24, in which a battery pack having the lowest voltage from among the blocked battery packs is coupled to the grid after measuring the total battery pack voltages; a total battery pack connection determining operation S25, in which it is determined whether or not all of the battery packs are coupled to the grid; a second time holding operation S26, in which, when it is determined that all of the battery packs are not coupled to the grid, and in a state where at least two battery packs are coupled to the grid, a second time is held to stabilize voltages and currents between the at least two battery packs coupled to the grid before additionally coupling any blocked battery pack to the grid.

The total switch turn-off operation S21 may be the case where at least one of the battery packs 210 is removed from the grid 220 for repair or replacement and is then reconnected to the grid. Here, all of the switches 230 are turned off to block the battery packs 210 from the grid 220.

In the first time holding operation S22, a certain period of time is held (e.g., a delay is introduced) to stabilize respective voltages and currents of the battery packs 210 blocked from the grid 220. Herein, the holding time of first time holding operation S22 may be set according to voltages, currents, structures, and wiring of the battery packs 210.

In the total battery voltage measuring operation S23, the voltage sensor 212 of each of the battery packs that have undergone the first time holding operation S22 measures the voltage of the corresponding battery pack 210, and transfers the measured value to the BMS 240.

In the lowest-voltage battery pack coupling operation S24, the BMS 240 selects the battery pack has the lowest voltage from among the battery packs 210 blocked from the grid 220, and couples the selected battery pack to the grid 220 via the corresponding switch 230. Herein, battery packs coupled to the grid 220 are excluded from the selection of the battery pack having the lowest voltage.

In the total battery pack connection determining operation S25, the BMS 240 determines whether or not all of the battery packs 210 are coupled to the grid 220 via their corresponding switch 230.

In the second time holding operation S26, when the BMS 240 determines that all of the battery packs 210 are not coupled to the grid 220 via their corresponding switch 230 in the total battery pack connection determining operation S25, and in a state where at least two battery packs 210*a*, 210*b*, 210*n*−1 are coupled to the grid, the BMS 240 holds the battery packs for the second time to stabilize voltages and currents between the at least two battery packs 210*a*, 210*b*, . . . , 210*n*−1 before additionally coupling any blocked battery pack 210*n*. Herein, the holding time of the second time holding operation S26 may be set according to voltages, currents, structures, and wiring of the battery packs 210, and may be about 200 to about 300 msec. However, the holding time of the second time holding operation S26 is not limited thereto.

Further, in the second time holding operation S26, the holding time may be a period of time for a current of the at least two battery packs 210*a*, 210*b*, 210*n*−1 to become smaller than about 10 A.

In the method for reducing or minimizing the rush current, according to another embodiment of the present invention, battery packs are sequentially coupled in order from smallest to largest voltage, with a holding time in-between successive couplings. Therefore, in comparison with use of a special switch and resistor, the rush current may be more stably reduced and the battery pack coupling time may be shortened.

According to an aspect of the present invention, when battery packs are coupled, a rush current may be stably reduced without using a special switch and resistor. Further, in comparison with use of the special switch and resistor, a battery pack coupling time may be shorter.

Exemplary embodiments have been disclosed herein, and although specific terms are employed, they are used, and are to be interpreted in, a generic and descriptive sense only and not for purpose of limitation. Accordingly, it will be understood by those of ordinary skill in the art that various changes in form and details may be made without departing from the spirit and scope of the present disclosure as set forth in the following claims and their equivalents.

What is claimed is:

1. An energy storage device for reducing a rush current, the device comprising:
   at least three battery packs configured to be coupled to a grid in parallel with each other;
   switches configured to electrically couple or block the at least three battery packs to or from the grid; and
   a battery management system (BMS) configured to control the at least three battery packs and the switches,
   wherein the BMS is configured to control the switches to sequentially couple the at least three battery packs to the grid in a lowest to highest order according to a voltage of each of the battery packs,
   wherein the BMS is configured to stabilize respective voltages and currents of the at least three battery packs during a first time holding operation when the at least three battery packs are blocked from the grid, and
   wherein the BMS is configured to stabilize voltages and currents of at least two battery packs that are coupled to the grid from among the at least three battery packs during a second time holding operation before additionally coupling a blocked battery pack from among remaining ones of the at least three battery packs that are blocked from the grid.

2. The energy storage device as claimed in claim 1, wherein each of the at least three battery packs comprises a plurality of battery cells coupled to each other in series, a voltage sensor, and a current sensor.

3. The energy storage device as claimed in claim 1, wherein the BMS comprises at least three pack BMSs corresponding to the at least three battery packs, and a system BMS.

4. The energy storage device as claimed in claim 3, wherein each of the at least three pack BMSs is configured to receive a voltage measurement and a current measurement of a respective one of the at least three battery packs, is configured to transfer the received voltage measurement and current measurement to the system BMS, is configured to receive a control signal from the system BMS for turning on or off a corresponding one of the switches, and is configured to turn on or off the corresponding one of the switches according to the control signal.

5. The energy storage device as claimed in claim 3, wherein the system BMS is configured to receive voltages and currents of the at least three battery packs from the at least three pack BMSs to control turning on or off of the switches.

6. The energy storage device as claimed in claim 1, wherein the BMS controls the switches to couple an arbitrary one of the at least three battery packs to be a first battery pack coupled to the grid in a coupling sequence.

7. The energy storage device as claimed in claim 6, wherein the BMS controls the switches to sequentially couple to the grid remaining ones of the at least three battery packs that are blocked from the grid, according to a respective voltage difference between a currently coupled battery pack and the remaining ones of the at least three battery packs that are blocked from the grid.

8. The energy storage device as claimed in claim 1, wherein the BMS controls the switches to sequentially couple to the grid the at least three battery packs in an order of a lowest to highest voltage as between remaining ones of the at least three battery packs that are blocked from the grid.

9. A method for reducing a rush current when coupling at least three battery packs in parallel to a grid, the method comprising:
   blocking all connections of the at least three battery packs to the grid;
   holding for a first time to stabilize respective voltages and currents of the blocked at least three battery packs;
   measuring the respective voltages of the at least three battery packs after holding for the first time;
   coupling an arbitrary first battery pack from among the at least three battery packs after performing the measuring of the respective voltages of the at least three battery packs;
   coupling a second battery pack from among remaining ones of the at least three battery packs that are blocked from the grid, the second battery pack having a voltage difference with respect to the first battery pack that is the smallest of respective voltage differences of the remaining ones of the at least three battery packs that are blocked from the grid;
   holding for a second time, when at least two battery packs are coupled to the grid, to stabilize voltages and currents of the at least two battery packs that are coupled to the grid before additionally coupling a blocked battery pack from among the remaining ones of the at least three battery packs that are blocked from the grid; and
   coupling a third battery pack from among the remaining ones of the at least three battery packs that are blocked from the grid, which has a voltage difference that is the smallest of the respective voltage differences, with respect to the second battery pack, of the remaining ones of the at least three battery packs that are blocked from the grid after repeating the holding for the second time.

10. The method as claimed in claim 9, wherein the voltage difference between the second and first battery packs is evaluated in terms of an absolute value.

11. The method as claimed in claim 9, wherein the second time is differently settable according to structures and wiring of the at least three battery packs.

12. The method as claimed in claim 9, wherein the second time is a period of time for currents of the coupled at least two battery packs to become smaller than about 10A.

13. A method for reducing a rush current between at least two battery packs when coupling the at least two battery packs to a grid in parallel, the method comprising:
   blocking all connections of the at least two battery packs to the grid;
   holding for a first time to stabilize respective voltages and currents of the blocked at least two battery packs;
   measuring the respective voltages of the blocked at least two battery packs after performing the holding for the first time;
   coupling to the grid a battery pack having the lowest voltage from among the blocked at least two battery packs after performing the measuring of the respective voltages of the at least two battery packs; and
   determining whether or not all of the at least two battery packs are coupled to the grid,
   wherein, where the number of the at least two battery packs is three or more, holding for a second time, when it is determined that all of the at least two battery packs are not coupled to the grid, to stabilize voltages and currents of already coupled battery packs before additionally coupling blocked battery packs.

14. The method as claimed in claim 13, wherein the second time is differently settable according to structures and wiring of the at least two battery packs.

15. The method as claimed in claim 13, wherein, the second time is a period of time taken for currents of the already coupled battery packs to become smaller than about 10A.

* * * * *